US010178583B2

United States Patent
Kim et al.

(10) Patent No.: US 10,178,583 B2
(45) Date of Patent: Jan. 8, 2019

(54) METHOD FOR TRANSMITTING OR RECEIVING INFORMATION ON NETWORK ACCESS OF TERMINAL IN WIRELESS COMMUNICATION SYSTEM AND APPARATUS THEREFOR

(71) Applicant: LG ELECTRONICS INC., Seoul (KR)

(72) Inventors: Taehun Kim, Seoul (KR); Jaehyun Kim, Seoul (KR); Sangmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/736,629

(22) PCT Filed: Jul. 15, 2016

(86) PCT No.: PCT/KR2016/007749
§ 371 (c)(1),
(2) Date: Dec. 14, 2017

(87) PCT Pub. No.: WO2017/010846
PCT Pub. Date: Jan. 19, 2017

(65) Prior Publication Data
US 2018/0176823 A1 Jun. 21, 2018

Related U.S. Application Data

(60) Provisional application No. 62/192,581, filed on Jul. 15, 2015.

(51) Int. Cl.
*H04W 36/00* (2009.01)
*H04W 28/08* (2009.01)
(Continued)

(52) U.S. Cl.
CPC .......... *H04W 28/08* (2013.01); *H04W 48/14* (2013.01); *H04W 48/16* (2013.01); *H04W 48/18* (2013.01)

(58) Field of Classification Search
CPC ..... H04W 8/183; H04W 48/18; H04W 36/30; H04W 36/18; H04W 36/12; H04W 36/04;
(Continued)

(56) References Cited

U.S. PATENT DOCUMENTS 6,097,954 A * 8/2000 Kumar ............... H04W 36/18
455/442
8,892,108 B2 * 11/2014 Borran ............... H04B 7/0417
370/329
(Continued)

FOREIGN PATENT DOCUMENTS

KR        10-0917744 B1    9/2009
KR    10-2015-0059801 A    6/2015
(Continued)

*Primary Examiner* — Dai Phuong
(74) *Attorney, Agent, or Firm* — Dentons US LLP

(57) ABSTRACT

Disclosed is a communication method of a network entity, which comprises: receiving state information from a plurality of neighboring network entities; selecting one network entity, which is not in a congestion state, among the plurality of network entities for a network access of a terminal, on the basis of the state information; and transmitting, to the terminal, a message including information for accessing of the terminal to the selected network entity.

10 Claims, 12 Drawing Sheets

(51) Int. Cl.
*H04W 48/16* (2009.01)
*H04W 48/14* (2009.01)
*H04W 48/18* (2009.01)

(58) Field of Classification Search
CPC ..... H04W 16/32; H04W 24/00; H04W 28/04; H04W 72/082
USPC ........................ 455/432.1–453, 456.1–456.3; 370/329–334
See application file for complete search history.

(56) References Cited

U.S. PATENT DOCUMENTS

| | | | | |
|---|---|---|---|---|
| 2008/0192638 | A1* | 8/2008 | Massiera | H04W 36/30 370/237 |
| 2012/0082029 | A1* | 4/2012 | Liao | H04W 76/15 370/230 |
| 2012/0178457 | A1* | 7/2012 | Liao | H04W 76/18 455/437 |
| 2012/0218889 | A1* | 8/2012 | Watfa | H04W 60/04 370/230 |
| 2012/0322489 | A1* | 12/2012 | Liu | H04W 76/20 455/514 |
| 2013/0148497 | A1* | 6/2013 | Chan | H04W 4/70 370/230 |
| 2015/0109917 | A1* | 4/2015 | Lu | H04M 7/0024 370/230 |
| 2015/0156691 | A1* | 6/2015 | Hayashi | H04W 36/12 455/436 |
| 2016/0057652 | A1* | 2/2016 | Chandramouli | H04W 28/0289 370/235 |
| 2016/0323774 | A1* | 11/2016 | Landais | H04W 12/06 |
| 2017/0118687 | A1* | 4/2017 | Tipton | H04W 36/14 |
| 2018/0042053 | A1* | 2/2018 | Martin | H04W 28/0205 |

FOREIGN PATENT DOCUMENTS

| | | |
|---|---|---|
| KR | 10-2015-0075844 A | 6/2015 |
| WO | 2014209088 A1 | 12/2014 |
| WO | 2015-034305 A1 | 3/2015 |

\* cited by examiner

| 8 | 7 | 6 | 5 | 4 | 3 | 2 | 1 | |
|---|---|---|---|---|---|---|---|---|
| Extended EMM cause IEI | | | | 0 spare | 0 | RAT access allowed | E-UTRAN allowed | octet 1 |

(a)

| 8 | 7 | 6 | 5 | 4 | 3 | 2 | 1 | |
|---|---|---|---|---|---|---|---|---|
| Extended EMM cause IEI | | | | 0 spare | 0 | RAT access type | E-UTRAN allowed | octet 1 |

(b)

METHOD FOR TRANSMITTING OR RECEIVING INFORMATION ON NETWORK ACCESS OF TERMINAL IN WIRELESS COMMUNICATION SYSTEM AND APPARATUS THEREFOR This application is a National Stage Application of International Application No. PCT/KR2016/007749, filed on Jul. 15, 2016, which claims the benefit of U.S. Provisional Application No. 62/192,581, filed on Jul. 15, 2015, all of which are hereby incorporated by reference in their entirety for all purposes as if fully set forth herein.

TECHNICAL FIELD

The present invention relates to a wireless communication system, and more particularly, to a method and apparatus for transmitting and receiving information for a user equipment to access a network in a network congestion state.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE OF THE INVENTION

Technical Task

An object of the present invention is to improve a network access process for a user equipment in a wireless communication system when a network entity is in a congestion state.

Another object of the present invention is to reduce unnecessary signaling overhead of a user equipment by improving signaling in a congestion state.

A further object of the present invention is to minimize the number of cases in which services are not provided to user equipments due to network congestion.

The technical problems solved by the present invention are not limited to the above technical problems and other technical problems which are not described herein will become apparent to those skilled in the art from the following description.

Technical Solutions

To achieve these objects and other advantages, in an aspect of the present invention, provided herein is a communication method, including: receiving state information from a plurality of network entities adjacent to a network entity; selecting one network entity which is not in a congestion state from among the plurality of network entities based on the state information for network access of a user equipment (UE); and transmitting, to the UE, a first message comprising information for the UE to access the selected network entity.

The plurality of network entities may comprise a network entity where Idle mode Signalling Reduction (ISR) is activated in association with the network entity, and the selecting may comprise selecting the network entity where the ISR is activated from among the plurality of network entities.

The communication method may further include receiving, from the selected network entity, a second message informing that the network access of the UE has been completed.

The information for the UE to access the selected network entity may include at least one of information on whether access to a different Radio Access Technology (RAT) is allowed, information on an ID of the selected network entity, information on an RAT corresponding to the selected network entity, and information on an ID of a cell to be accessed by the UE.

The information for the UE to access the selected network entity may indicate that the UE needs to access the selected network entity using information for accessing the selected network entity.

The first message may include a paging message or an Evolved Packet System Mobility Management (EMM) rejection message.

The selecting may be performed when it is informed that downlink data from a different network entity to the UE is generated or when the UE requests the network access.

The state information may include at least one of information indicating a load state of each of the plurality of network entities and information indicating a congestion state of each of the plurality of network entities, and the state information may be received from each of the plurality of network entities periodically or aperiodically.

The selected network entity may be selected from among network entities corresponding to RATs that the UE can support.

Each of the network entity and the selected network entity is implemented as a Mobility Management Entity (MME), a Serving General packet radio service Supporting Node (SGSN), an evolved Node B (eNB), a Radio Network Controller (RNC) or a Base Station Controller (BSC).

In another aspect of the present invention, provided herein is a network entity, including: a transmitter; a receiver; and a processor connected to the transmitter and the receiver. In this case, the processor may be configured to: receive state information from a plurality of network entities adjacent to the network entity; select one network entity which is not in a congestion state from among the plurality of network entities based on the state information for network access of a user equipment (UE); and transmit, to the UE, a first message comprising information for the UE to access the selected network entity.

Advantageous Effects

As is apparent from the above description, the embodiments of the present invention have the following effects.

First, it is possible to efficiently transmit information for a user equipment to access a network even in a congestion state.

Second, unnecessary signaling overhead of a user equipment can be reduced, and services can be provided to a user without any interruption, thereby improving user experience.

Third, it is possible to prevent a user equipment from being delayed in accessing a network due to network congestion.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE FOR INVENTION

Figure 1:
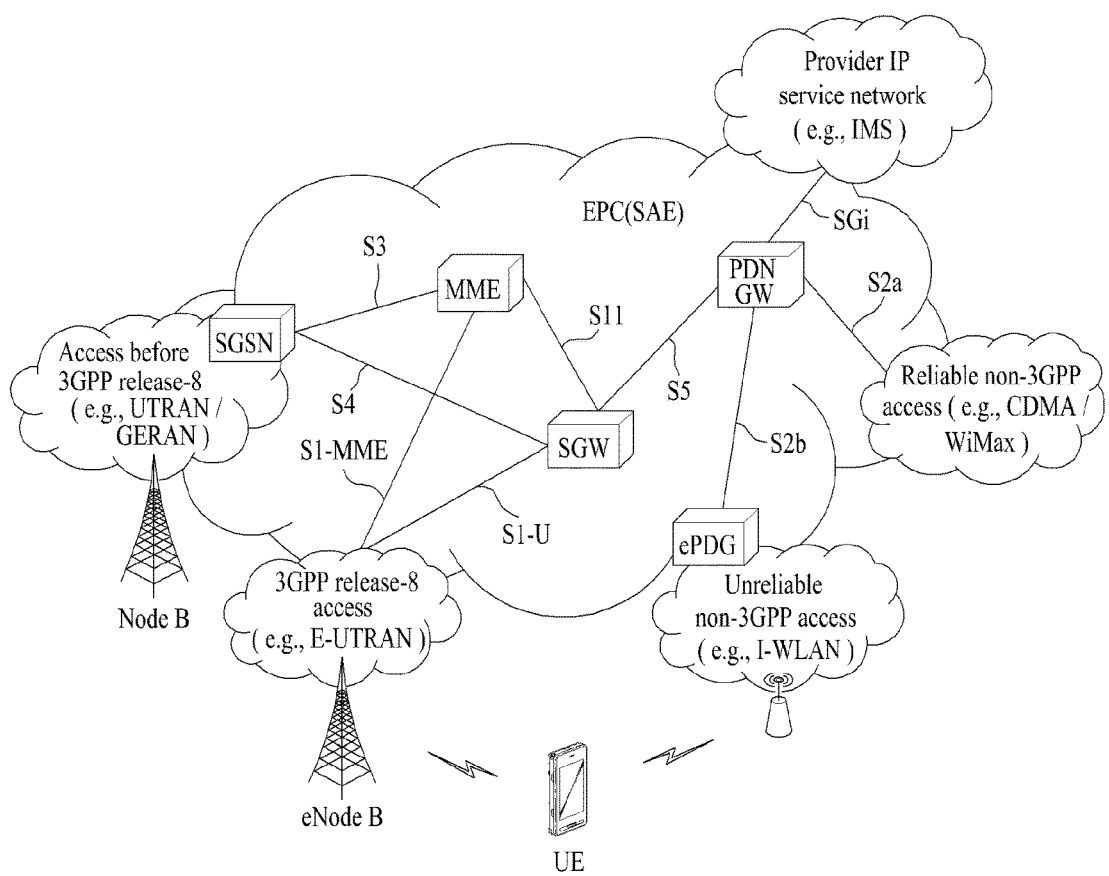
FIG. 1 is a diagram illustrating a brief structure of an evolved packet system (EPS) that includes an evolved packet core (EPC).

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

First of all, the terms used in this specification can be defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

PCRF (Policy and Charging Rule Function): a network node of an EPS network, which performs a policy decision to dynamically apply different QoS and charging policies for each service flow.

OMA DM (Open Mobile Alliance Device Management): a protocol designed to manage mobile devices such as a cell phone, a PDA, and a laptop computer, which performs functions such as device configuration, firmware upgrade, error report, and the like.

OAM (Operation Administration and Maintenance): a set of network management functions, which provides network error display, performance information, data, and management functions.

NAS (Non-Access Stratum): a higher stratum of a control plane between a UE and MME. As a functional layer for exchanging signaling and traffic messages between a UE and core network in LTE/UMTS protocol stack, the NAS supports UE mobility, a session management procedure for establishing and maintaining an IP connection between a UE and PDN GW, and IP address management.

AS (Access-Stratum): the AS includes a protocol stack between a UE and a radio (or access) network, which manages transmission of data and network control signals.

NAS configuration MO (Management Object): the NAS configuration MO is a management object (MO) used to configure parameters related to NAS functionality for a UE.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

APN (Access Point Name): a character string for indicating or identifying PDN. To access a requested service or network, a connection to a specific P-GW is required. The APN means a name (character string) predefined in a network to search for the corresponding P-GW (for example, it may be defined as internet.mnc012.mcc345.gprs).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

ANDSF (Access Network Discovery and Selection Function): This is one of network entities for providing a policy for discovering and selecting an access that can be used by a UE on an operator basis.

1. Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
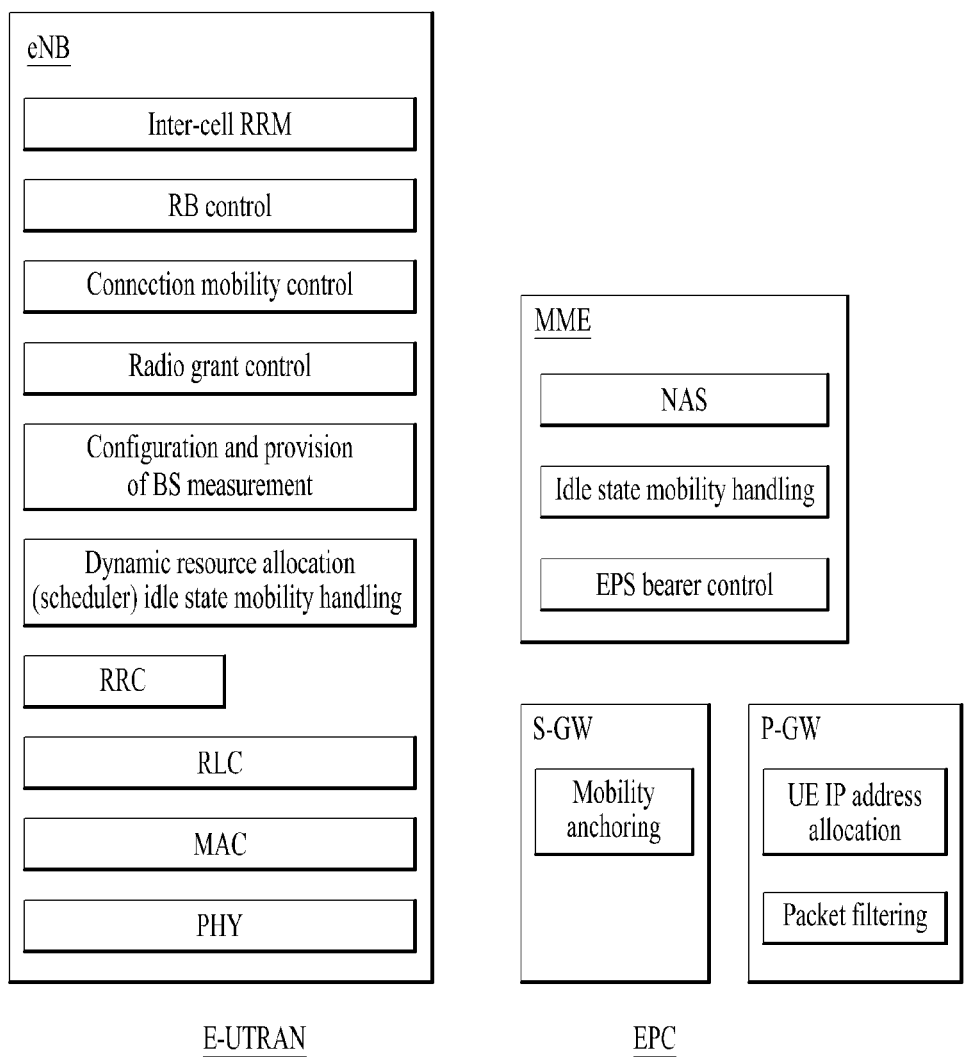
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
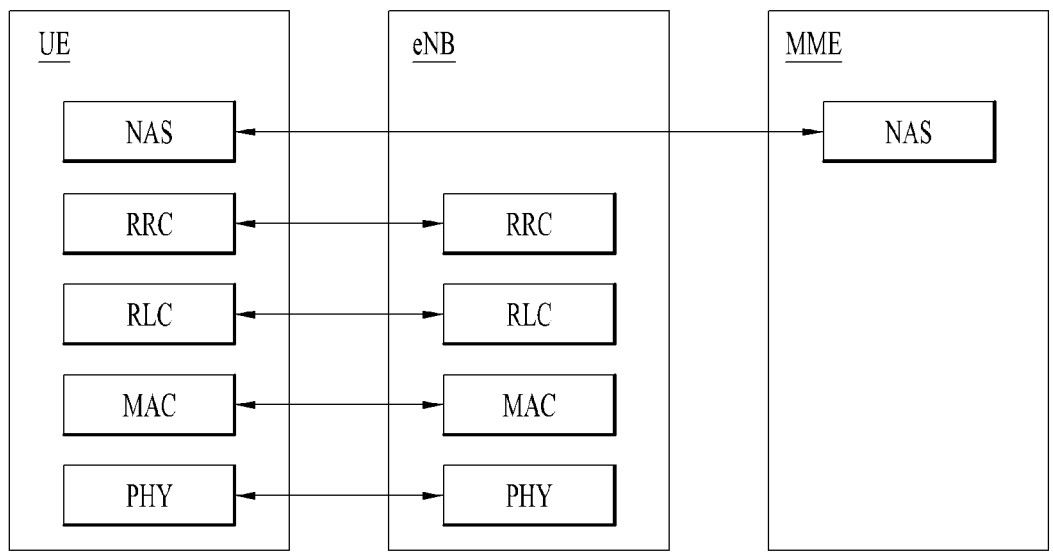
FIG. 3 is an exemplary diagram illustrating a structure of a radio interface protocol on a control plane.
Figure 4:
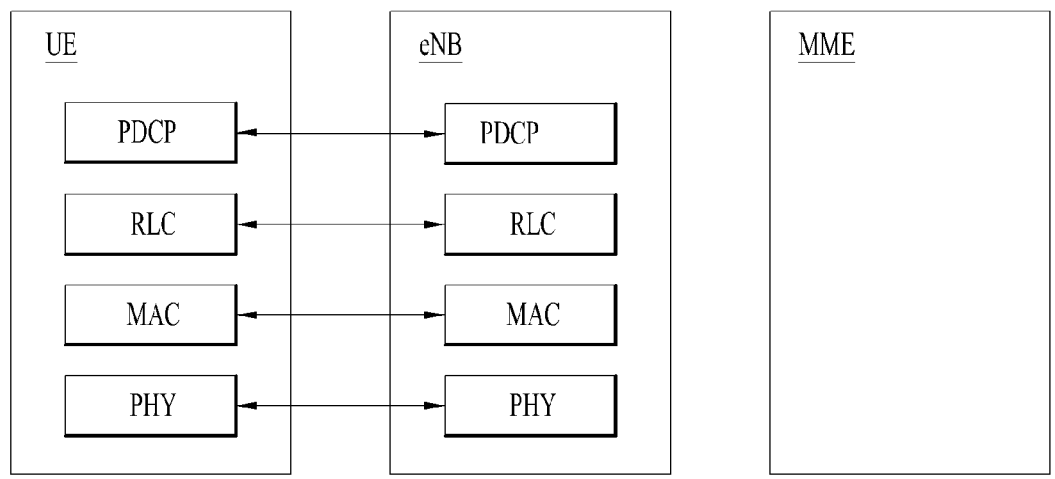
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (Evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
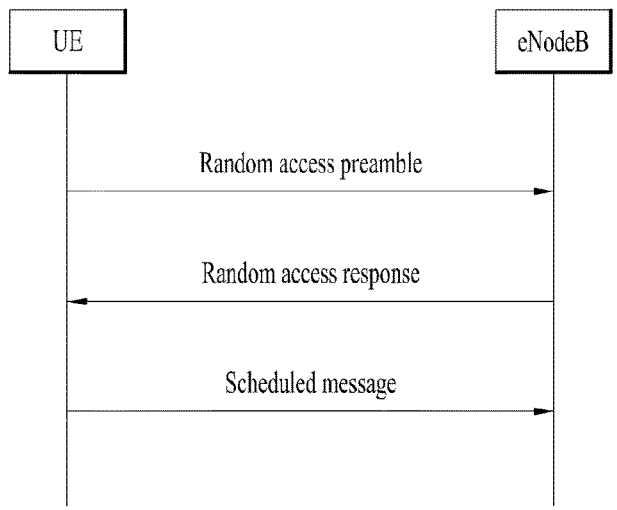
FIG. 5 is a flow chart illustrating a random access procedure.

FIG. 5 is a flowchart illustrating a random access procedure in 3GPP LTE.

The random access procedure is performed for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
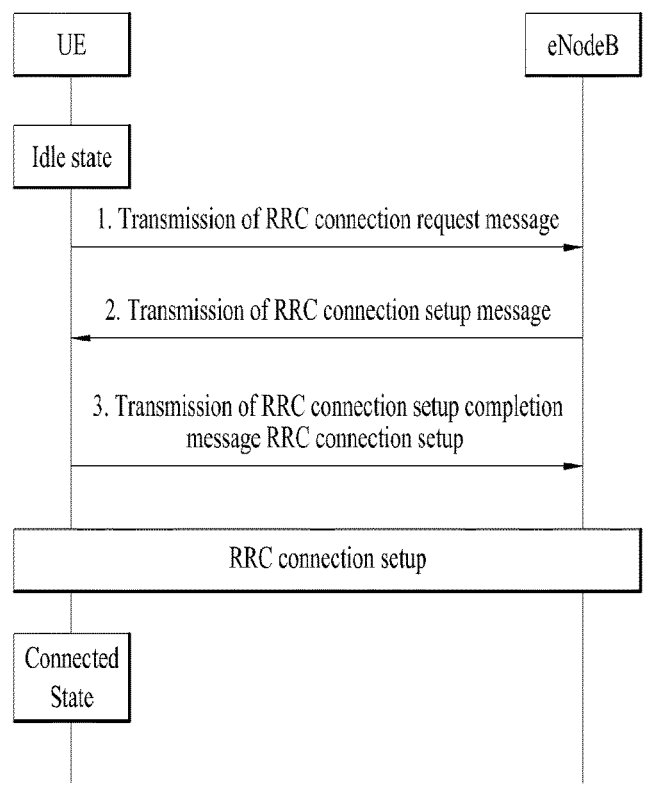
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

2.1 Network Triggered Paging Procedure

Figure 7:
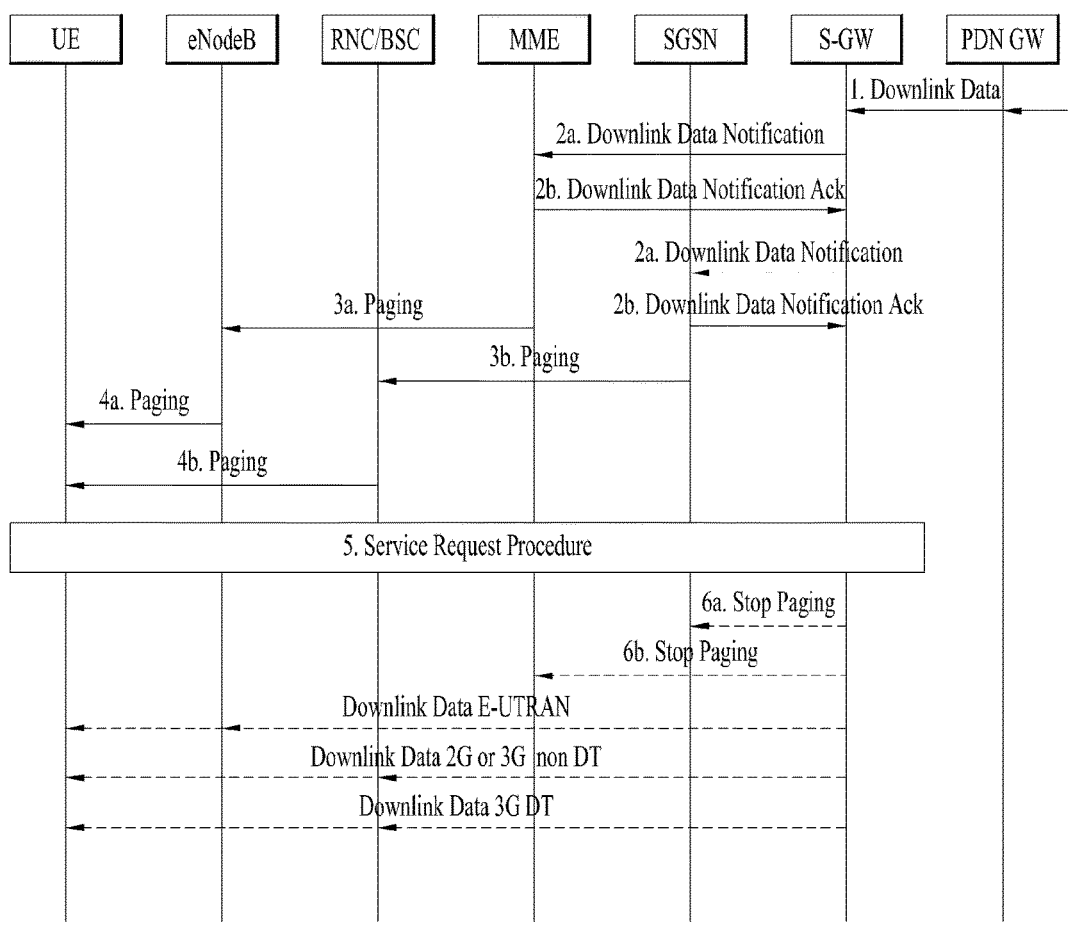
FIGS. 7 and 8 are diagram illustrating a paging procedure related to a proposed embodiment.
Figure 8:
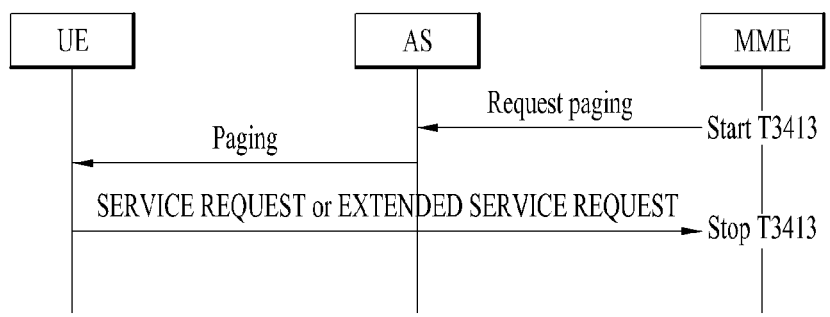

FIGS. 7 and 8 are diagram illustrating a paging procedure related to a proposed embodiment.

As shown in FIG. 7, the network triggered paging procedure described in TS 23.401 is initiated when an MME or SGSN receives downlink data notification (DDN) informing that downlink data is generated. After receiving the DDN through an SGW from a PGW, the MME/SGSN transmits a paging message to all eNBs/RNCs included in a tracking area where a UE that will receive the downlink data is registered. After receiving the paging message, the eNBs/RNCs pages the UE. When the UE, which operates in ECM (EPS connection management)-idle mode, is paged, the UE initiates a service request (SR) procedure. When the UE completes the SR procedure, the paging is terminated and then the buffered downlink data is transmitted to the UE.

Meanwhile, if a NAS signaling message, a CDMA2000 signaling message, and user data are hold and there is no NAS signaling connection, the above-described paging procedure should be initiated by a network. That is, even if the network is in a congestion state, the paging procedure should be performed by network entities. In addition, as shown in FIG. 8, when transmitting the paging message, the MME/SGSN starts a timer, T3414. If there is no response to the paging message before expiration of the timer, T3414, the MME/SGSN can retransmit the paging message.

As described above, the paging procedure should be initiated even when the network is congested. It may be considered when a UE transmits an SR or TAU request message as a response to the paging message in the network congestion state. That is, the response to the paging message does not correspond to a message that cannot be rejected by the network in the network congestion state. This means that a network entity can reject the (E)MM message (SR or TAU request message) transmitted by the UE by reason of the network congestion.

Meanwhile, when the (E)MM message is rejected by reason of the network congestion, a rejection message includes cause #22 for indicating the congestion and a back-off timer, T3346. This back-off timer, T3346 is applied to all RATs (radio access technologies) of the UE. That is, since the back-off timer is applied to all the RATs of the UE even when the MME or SGSN is congested, the UE loses an opportunity of accessing the network through other RATs. In addition, the same problem also occurs when only a specific MME included in the same RAT (e.g., E-UTRAN) is congested and other MMEs are not congested.

Hereinafter, paging scenarios in the network congestion state will be described in detail. First, a case in which an eNB is congested will be described. The SR procedure, which is initiated by a network due to a DDN message transmitted from an SGW to an MME, is triggered. After receiving the DDN message, the SGW transmits a paging message to the eNB. In this case, although the eNB initiates barring of mobile terminating (MT) calls because it is congested, the eNB should forward the paging message to a UE. After receiving the paging message, the UE transmits, to the network, an (E)MM signaling message such as an SR message, extended SR message, TAU request message, etc. as a response to the paging message.

In this case, a NAS layer of the UE generates the (E)MM signaling message and then delivers a data packet to an AS layer by setting a generation cause of RRC to 'MT access' and a call type to 'terminating call'. Thereafter, the AS layer of the UE explicitly includes 'MT access', which is received from the NAS layer, in an establishmentCause field of an RRC connection request message and then transmits it to the eNB.

However, since the eNB is congested as described above, the RRC connection request message from the UE is blocked. Since barring of MT calls has been initiated in a corresponding cell, the eNB rejects the RRC connection request message and transmits an RRC connection rejection message and timer to the UE. The UE cannot create new RRC signaling in the corresponding cell until the received timer is expired or stopped.

Meanwhile, since the MME does not know the situation between the eNB and UE, the MME may retransmit the paging message to the eNB. That is, since the MME cannot check the fact that the eNB transmits the RRC connection rejection message to the UE when the eNB is congested, the paging message may be transmitted again. In this case, the eNB should retransmit the paging message, and the UE should response to the paging message again. In other words, it causes signaling overhead.

Next, a case in which, rather than the eNB, the MME is congested will be described. Similar to the case where the eNB is congested, the MME receives the DDN and should transmit the paging message to the eNB even though it is congested. Thereafter, the eNB forwards the paging message to the UE. After receiving the paging message, the UE transmits the (E)MM signaling message to the network in response to the paging message.

In this case, since the MME is congested, the (E)MM signaling message is rejected. The MME includes the cause #22 and the timer, T3346 in a rejection message and then transmit the rejection message to the UE. The UE cannot transmit a new (E)MM signaling message until the corresponding timer is expired or stopped. In this case, if the MME retransmits the paging message to the UE, the above-described series of processes may be repeated unnecessarily.

Further, the same problem may occur when a UE generates mobile originated (MO) data or transmits MO signaling unlike the above-described processes. That is, when the network is congested, if the UE transmits the MO data or MO signaling to the network, the eNB or MME rejects an RRC message or (E)MM signaling message. Thus, a rejection message and timer are transmitted to the UE, and the UE cannot transmit a new RRC message or (E)MM signaling message until the timer is expired or stopped.

This is because the back-off timer is commonly applied to all the RATs of the UE as described above. Specifically, if a plurality of UEs simultaneously change their RATs to a specific RAT to another RAT, it may make a new network congested. To prevent this problem, the back-off timer is commonly applied to all the RATs. However, if the network is able to control each UE to use a different RAT by considering the surrounding environments, the above-described network congestion problem can be prevented in spite of the back-off timer.

2.2 ISR(Idle Mode Signalling Reduction)

In the related art, a UE should perform a TAU/RAU procedure whenever the RAT is changed. To reduce signaling overhead that the TAU/RAU procedure is performed whenever the RAT is changed, an ISR technology is introduced. To apply the ISR, both a UE and network entity (MME and/or SGSN) should have ISR capability, and detailed operations are as follows.

First, from the perspective of a network, an MME and SGSN, each of which has the ISR capability, exchange context information of a UE with each other and then check that the UE also has the ISR capability. In addition, an SGW and HSS recognize that each of the MME and SGSN has the ISR capability. Next, if there is downlink data to be transmitted, the SGW transmits DDN to the MME and SGSN. After receiving the DDN, the MME and SGSN performs the paging procedure. Since the UE with the ISR capability does not perform TAU/RAU when the RAT is changed, the MME and SGSN cannot know which RAT the UE uses and thus perform paging for the UE.

Thereafter, the UE does not perform the TAU/RAU when the RAT is changed in the MME and SGSN, both of which have the activated ISR. However, when the UE is out of coverage of the corresponding MME and SGSN, the UE performs the TAU/RAU. That is, the UE's activated ISR means that the UE is registered in both the MME and SGSN. Due to the ISR operation, it is possible to reduce not only the amount of signaling among the UE and network entities but also the amount of signaling between the network entities.

3. Proposed Communication Method Among a UE and Networking Entities

To solve the problems, a communication method for network entities will be described with reference to FIGS. 9 to 15. That is, the present invention proposes not only a communication method for when a network entity (e.g., eNB or MME) is congested but also a method for efficiently triggering operation of a UE.

Figure 9:
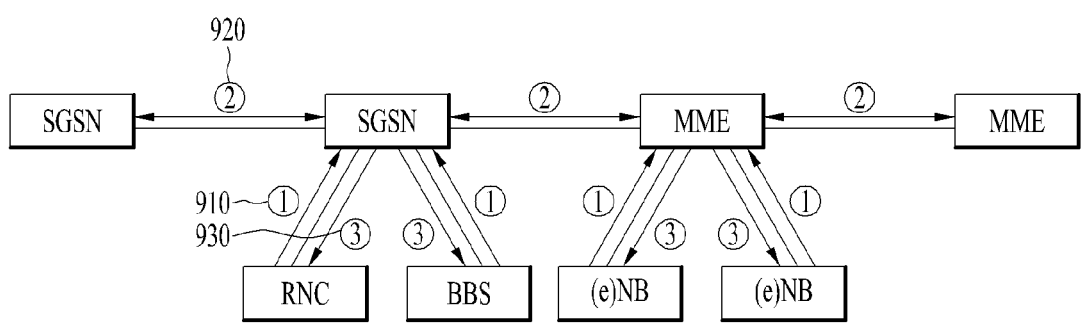
FIG. 9 is a diagram illustrating a process for signaling between network entities related to a proposed embodiment.

According to a proposed embodiment, network entities share information indicating load states or congestion states with neighboring network entities. FIG. 9 illustrates a process in which network entities share state information with each other according to the proposed embodiment.

Referring to FIG. 9, the MME/SGSN can share load state information or congestion state information with a neighboring SGSN (or MME). The state information can be exchanged periodically, or it can be exchanged aperiodically based on a specific event. As an example of the aperiodic exchange, when the MME/SGSN enters the congestion state, the MME/SGSN can inform the neighboring MME or SGSN of its congestion state and then receive feedback of states of the neighboring entities [920].

The information exchanged between network entities will be described in detail. The load state information may include information indicating how many UEs the MME/SGSN can additionally support, and the congestion state information may include information indicating whether the MME/SGSN is congested or information indicating whether the MME/SGSN performs barring. The congestion state information may indicate whether the MME/SGSN is congested or not on an eNB/RNC/BSC (Base Station Controller), which shares an interface with the corresponding MME/SGSN, basis or a cell basis. In this case, the congestion state information may include an address or ID value for identifying a corresponding eNB/RNC/BSC or cell. For the above-described process, the eNB/RNC/BSC should report information on the congestion state or information on whether barring is performed to the MME/SGSN [910]. On the other hand, the MME/SGSN can transmit the information shared with the neighboring SGSN (or neighboring MME) or its information to the eNB/RNC/BSC to share the information [930]. Alternatively, the MME/SGSN can check a neighboring SGSN (or neighboring MME), which is not congested or is able to accommodate more loads, based on the received information and then inform the eNB/RNC/BSC of the neighboring SGSN.

In addition, the information exchanged between network entities may include UE's context information as well as their state information. In this case, as the UE's context information, information on UE's ISR capability may be exchanged between the network entities. That is, the network entities may exchange information indicating whether a UE supports the ISR capability and information indicating whether the UE's ISR capability is activated. Meanwhile, although the ISR-related information may be transmitted and received together with the above-described load state information, congestion state information between the network entities, the SR-related information may be transmitted and received in advance separately from the station information of the network entities.

Specifically, while the ISR is activated, the MME and SGSN can exchange the ISR capability and then recognize their network IDs. Thereafter, the MME and SGSN can exchange the above-described load station information and congestion state information periodically or aperiodically.

Next, a process in which the MME/SGSN utilizes the information shared between the network entities and a process in which the eNB/RNC/BSC utilizes the information will be described. First, the overall operation according to an embodiment is described, and then details will be described later with reference to FIGS. 10 to 14.

First, an embodiment in which the MME/SGSN utilizes the shared information of FIG. 9 is described. It is assumed that when a specific MME/SGSN is congested and a neighboring MME/SGSN is not congested, the congested MME/SGSN transmits a paging message to a UE. If the congested MME/SGSN receives an (E)MM signaling message from the UE, the congested MME/SGSN determines whether it processes the (E)MM signaling message from the UE. That is, in the case of MT, the MME/SGSN determines whether it will process the (E)MM signaling message generated in response to the paging message, which is transmitted to the UE according to DDN. In the case of MO, the MME/SGSN determines whether it will process the (E)MM signaling message, which is received from the UE.

If the MME/SGSN determines that it will not process the (E)MM signaling message, the MME/SGSN checks whether there is an MME/SGSN that is not congested among neighboring MMEs/SGSNs because the corresponding MME/SGSN is congested. Hereinafter, the MME/SGSN that is not congested is referred to as a 'valid MME/SGSN'. If there is a valid MME/SGSN, the congested MME/SGSN checks whether the UE supports an RAT of the corresponding valid MME/SGSN. This process can be performed by checking UE subscription information or UE context information.

For example, if the entity that receives the signaling message from the UE is an MME and the neighboring valid entity is an SGSN, the MME in the congestion state checks whether the UE supports A/Gb mode or Iu mode. If the SGSN supports either the A/Gb mode or Iu mode, the MME should also check whether the UE supports the corresponding specific mode. On the contrary, if the entity that receives the signaling message from the UE is an SGSN and the neighboring valid entity is an MME, the SGSN should check whether the UE supports S1 mode.

Meanwhile, the congested entity and neighboring valid entity may be the same type of entities, that is, either MMEs or SGSNs. In this case, whether the UE supports specific mode may not be checked. However, when both the entities are SGSNs, whether the SGSNs support either the A/Gb mode or Iu mode needs to be checked, and then whether the UE supports the corresponding mode should be checked as well.

When the UE cannot access the neighboring valid entity (MME/SGSN) based on the above-described process, the congested network entity can exclude the corresponding neighboring network entity from candidates. Hereinafter, a network entity that a UE can access among neighboring valid network entities is referred to as an active network entity.

Meanwhile, an active network entity can be selected from not only network entities that the UE can access but also currently congested network entities and network entities having the activated ISR. That is, since when the ISR is activated between two network entities, signaling overhead required for the UE's TAU/RAU procedure may be reduced, the congested network entity may select the network entity that activates the ISR together with the corresponding congested network as the active network entity for the UE. As described above, information on a network entity having the activated ISR is collected by a counterpart network entity while the ISR is activated.

When the active network entity is confirmed, the congested network entity transmits information indicating the confirmed active network entity by including the information in the paging message to be transmitted to the UE or the rejection message in response to the (E)MM signaling message. If there are two or more active network entities, the congested network entity may select all or some of them and then inform the UE of the selected active network entities. Some network entities may be selected based on the degrees of congestion, UE subscription information, or capability.

Specifically, the information on the active network entity transmitted to the UE may be configured with an indicator indicating a specific RAT (e.g., E-UTRAN=1, UTRAN=2, GERAN=3, etc.), an MME/SGSN ID, (e.g., GUMMEI (Globally Unique Mobility Management Entity Identifier)), information indicating a specific cell (e.g., cell ID).

Meanwhile, the rejection message in response to the (E)MM signaling message may include the back-off timer, T3346 as described above. If the aforementioned information on the active network entity is received together with the back-off timer, the back-off timer may be applied by excluding the active network entity. That is, it could be interpreted to mean that the back-off timer is applied to the network entity (or RAT) that transmits the rejection message but the active network entity (or RAT) is excluded. In other words, if the information on the active network entity indicates E-UTRAN, the back-off timer received together with the information is applied to all other RATs except the E-UTRAN. That is, the back-off timer is not applied to the E-UTRAN. Alternatively, the active network entity information indicates a specific MME ID, the back-off timer is applied to other network entities except one indicated by the MME ID.

Next, an embodiment in which an eNB/RNC/BSC utilizes the shared information described in FIG. 9 will be described. When a congested eNB/RNC/BSC transmits a paging message to a UE or receives an RRC connection request message from the UE, the congested eNB/RNC/BSC determines whether it will process a message from the UE. Specifically, in the case of the paging message, the congested eNB/RNC/BSC determines whether it will process the RRC connection request message generated in response to the paging message. When the RRC connection request message is generated due to MO signaling, the congested eNB/RNC/BSC determines whether it will process the UE's RRC connection request message.

If the eNB/RNC/BSC determines that it cannot process the UE's message due to the congestion, the eNB/RNC/BSC checks whether the corresponding UE supports other RATs. To this end, the eNB/RNC/BSC requests an MME/SGSN to inform subscription information or context information of the UE and then checks the UE's subscription information or context information. By doing so, the eNB/RNC/BSC can know which RAT the UE supports.

After checking the RAT supported by the UE, the eNB/RNC/BSC selects a network entity that is not congested from neighboring network entities. Unlike the embodiment related to the MME/SGSN, since the UE's RAT is checked, a valid network entity may become an active network entity. Thereafter, the eNB/RNC/BSC may include information on the selected active network entity in the rejection message in response to the RRC connection request message and then transmit the information to the UE.

In this case, the information on the active network entity may be configured with an indicator indicating a specific RAT, an ID of the active network entity, or a cell ID. Meanwhile, when the eNB/RNC/BSC transmits a timer by including it in the rejection message in response to the RRC connection request message transmitted from the UE, the eNB/RNC/BSC may also transmit information on the timer to the MME/SGSN. After receiving the information on the timer, the MME/SGSN may stop retransmission of the paging message to the UE and then inform an SGW of it.

Meanwhile, when the MME/SGSN or eNB/RNC/BSC fails to discover the network entity that is not congested from neighboring network entities, the MME/SGSN or eNB/RNC/BSC may transmit a timer value to the UE by including the timer value in the rejection message as in the related art.

Hereinafter, a description will be given of operation of a UE that receives information on an active network entity from a network entity. When the received information indicates that the UE needs to change only a cell except the network entity (e.g., SGSN or MME), the UE performs the SR/TAU/RAU procedure for a corresponding cell. On the other hand, when the received information indicates that the UE needs to change the network entity (e.g., SGSN or MME), the UE performs the TAU/RAU procedure for a new network entity. In this case, if a user plane bearer needs to be established (that is, an additional SR procedure is required), the UE can set an active flag value in the TAU/RAU request message to 1 and then transmit it to the network entity. When the active flag is set to 1, the SR procedure is performed after the TAU/RAU. When a cell ID is received as the information on the active network entity, the UE may preferentially select a corresponding cell in the cell selection process. In addition, when the UE receives an MME/SGSN ID as the information on the active network entity, the UE may transmit the information to the eNB by including the information in the RRC connection request message. After receiving the RRC connection request message including the information on the active network entity, the eNB may transmit the RRC connection rejection message in the following cases: when the eNB has no connection with the indicated MME/SGSN, when the eNB fails to deliver the (E)MM signaling message, and when the eNB is rejected by the MME/SGSN. In this case, the RRC connection rejection message to be transmitted to the UE may include reasons for the rejection. After receiving the RRC connection rejection message, the AS layer of the UE may inform the NAS layer of the rejection and reasons therefor.

According to the above processes, a UE may skip unnecessary signaling, which is required due to the congestion state of a network entity, and signaling overhead caused when the UE to access a network entity, which is not congested, is also reduced.

Figure 10:
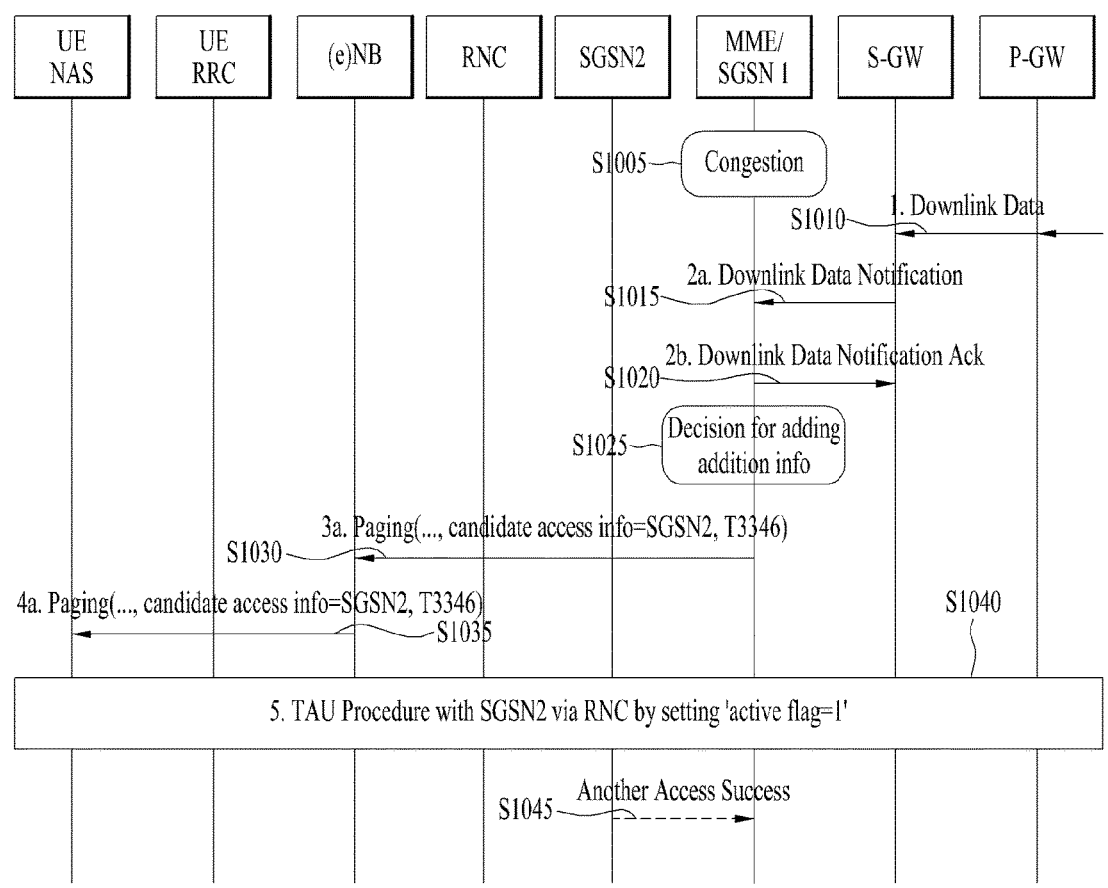
FIGS. 10 to 13 are diagrams illustrating a communication method according to a proposed embodiment.
Figure 11:
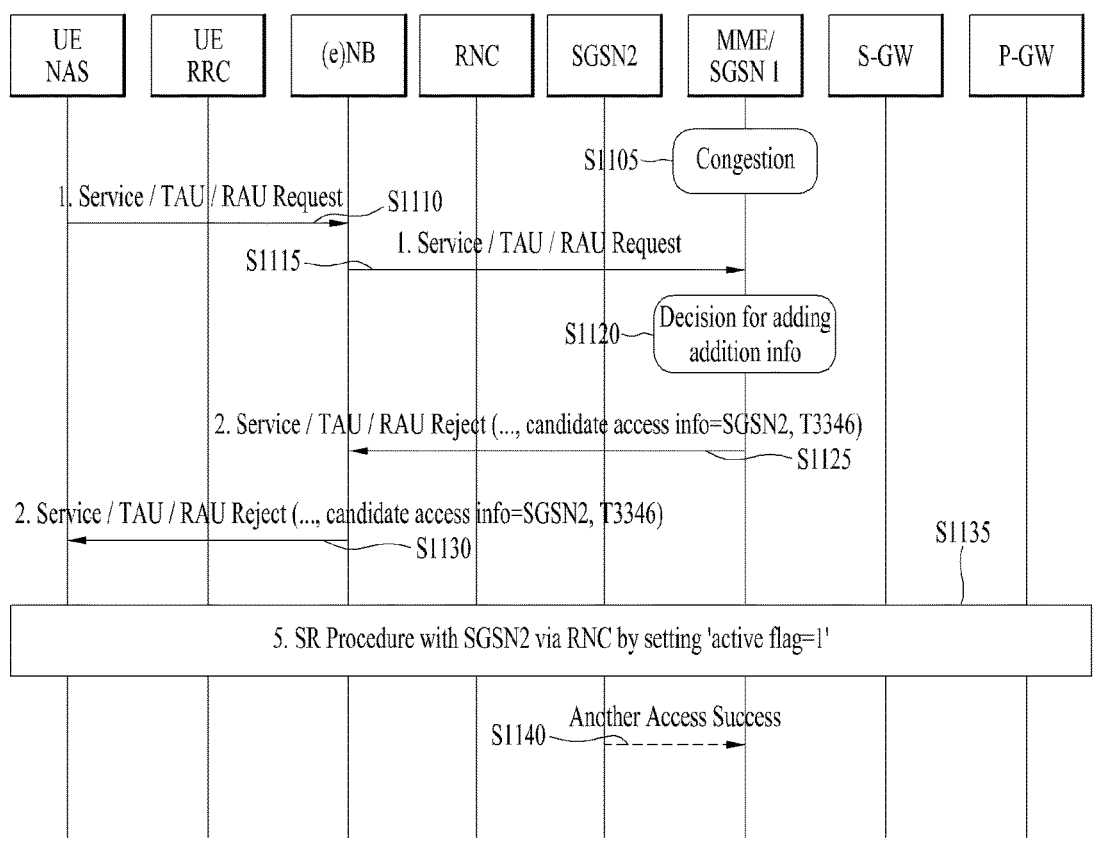
Figure 12:
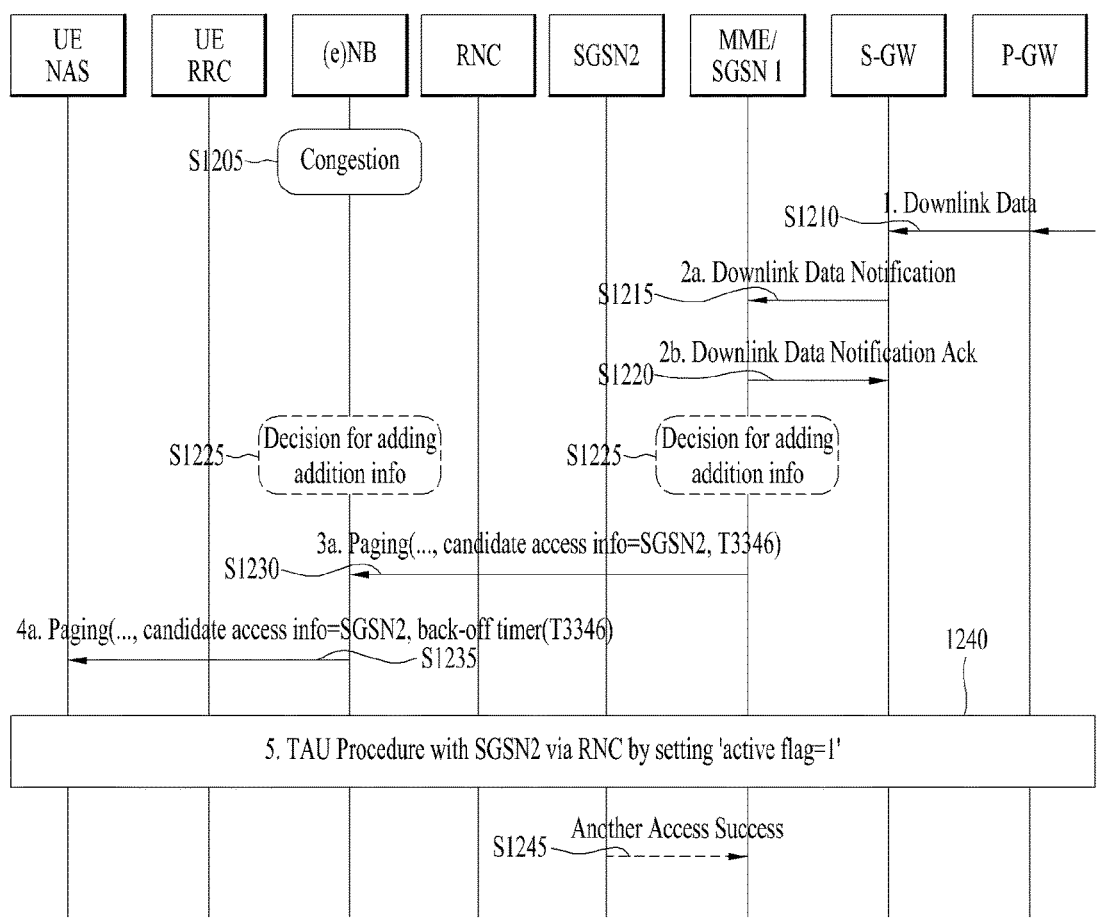
Figure 13:
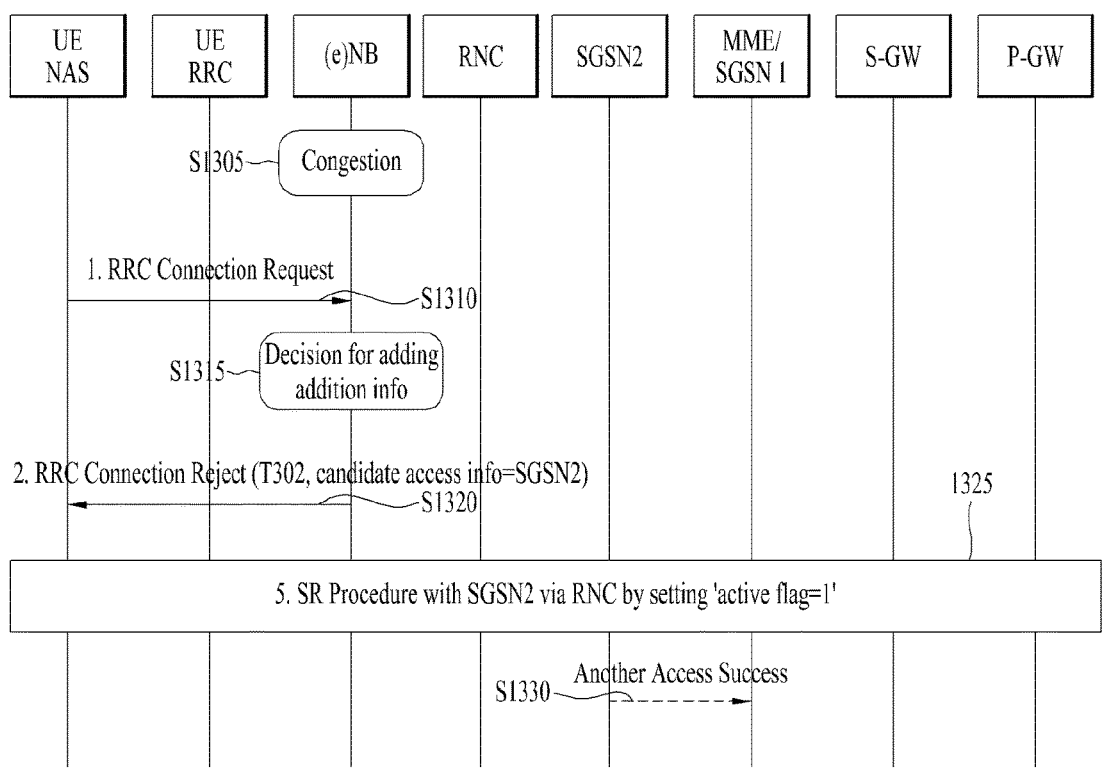

Hereinafter, processes in which the embodiments in FIGS. 10 to 15 are applied to individual scenarios will be described in detail. FIGS. 10 and 11 shows a case in which an MME/SGSN is congested, and FIGS. 12 and 13 shows a case in which an eNB/RNC/BSC is congested.

FIG. 10 shows MT signaling when MME/SGSN1 is congested [S1005]. According to the processes described in FIG. 9, the MME/SGSN1 exchange load state information and congestion state information with a neighboring network entity, SGSN2 periodically or aperiodically. In FIG. 10, after receiving DDN from an SGW, the congested MME/SGSN1 determines whether it will process signaling from a UE [S1015, S1020, and S1025]. In this case, since the congested MME/SGSN1 knows that the neighboring SGSN2 is not congested, the MME/SGSN1 selects the SGSN2 as an active network entity. The SGSN2, which is selected as the active network entity, may be a network entity that activates the ISR together with an MME.

The MME/SGSN1 transmits information on the active network entity to the UE by including the information in a paging message [S1030]. The active network entity information may be information indicating the SGSN2 that is adjacent to the MME/SGSN1 and not congested or RAT information corresponding to the SGSN2. Meanwhile, the paging message may selectively include the timer, T3346 [S1030 and S1035].

If necessary, after receiving the paging message, the UE attempts to access the SGSN2 through an RNC by changing the RAT [S1040]. During this process, an active flag value included in a TAU request message may be set to '1', and thus an SR procedure may also be performed after a TAU procedure. In this case, if the SGSN2 is a network entity that activates the IRS together with an MME, the UE may directly access the SGSN2 by changing the RAT without the TAU/RAU procedure. That is, the above-described step S1040 may be dropped according to whether the ISR is activated.

Meanwhile, this process is applied when the UE can access the SGSN2. On the contrary, when the UE is not in an area where the access to the SGSN2 is possible, the UE can perform the SR procedure through the MME/SGSN1 as in the related art. In this case, the UE does not create NAS signaling before expiration of the timer T3346 included in the paging message and performs the SR procedure after the expiration of the timer.

When the UE successfully completes the TAU and SR procedures through the SGSN2, the SGSN2 may transmit, to the MME/SGSN1, an 'another access success' message indicating that the UE successfully performs the access through another network entity [S1045]. That is, this signaling may prevent an additional paging process from being performed unnecessarily.

Alternatively, when the UE performs the TAU procedure, the MME/SGSN1 may recognize that the UE attempts to access another network entity. Thus, even though there is no 'another access success' message, the MME/SGSN1 can stop retransmission of the paging message to the UE.

Meanwhile, in the step S1040, a process in which the MME/SGSN1 or eNB retransmits the paging message may be triggered. However, since the MME/SGSN1 or eNB has transmitted the information on the active network entity (SGSN2) to the UE by including the information in the paging message, the MME/SGSN1 or eNB can know that the UE has attempted to access another network entity through the SGSN2. Therefore, the MME/SGSN1 or eNB does not perform the process for retransmitting the paging message to the UE.

FIG. 11 shows MO signaling when MME/SGSN1 is congested. When the congested MME/SGSN1 receives a NAS signaling message (e.g., SR/TAU/RAU request message) from a UE [S1105, S1110, and S1115], the MME/SGSN1 determines whether it will process the message from the UE [S1120].

Meanwhile, since the MME/SGSN1 already knows that a neighboring network entity, SGSN2 is not congested, the MME/SGSN1 may determine that the SGSN2 will process signaling from the UE instead of itself. Next, the MME/SGSN1 transmits information indicating that the SGSN2 is an active network entity by including it in an SR/TAU/RAU rejection message [S1125 and S1130]. In this case, since the rejection message is transmitted because the MME/SGSN1 is congested, the cause #22 and the timer, T3346 are included in the rejection message.

After receiving the rejection message and active network entity information, the UE recognizes that the SGSN2 is not congested and then attempts to access the SGSN2. If the SGSN2 is located in an area where the UE cannot achieve the access, the UE waits for expiration of the timer as in the related art and then transmits a new SR/TAU/RAU message to the MME/SGSN1. On the contrary, if the SGSN2 is located in an area where the UE can be accessed, the UE performs the SR/TAU/RAU procedure for the SGSN2 [S1135]. If the SGSN2 activates the ISR together with an MME, the UE may skip the TAU/RAU procedure as described above with reference to FIG. 10.

When the UE successfully completes the access to the SGSN2, the SGSN2 informs the MME/SGSN1 that the UE completes the access by transmitting an 'another access success' message to the MME/SGSN1 [S1140].

FIG. 12 shows MT signaling when an eNB/RNC/BSC is congested. Since the steps S1210 to S1220 of FIG. 12 are similar to the steps of FIG. 10, details will be omitted herein. Meanwhile, referring to FIG. 12, the eNB is currently congested [S1205], and an MME/SGSN1 knows that the eNB is congested. That is, as described above in FIG. 9, since the eNB and MME/SGSN1 shares information, the MME/SGSN1 can know in advance that the eNB is in the congestion state.

Thus, before the congested eNB transmits a paging message to a UE, the MME/SGSN1 can determine whether the congested eNB should process a paging network access procedure for the UE [S1225]. When the MME/SGSN1 determines that SGSN2 needs to process UE's access, the MME/SGSN transmits a paging message to the eNB by including information indicating the SGSN2 in the paging message [S1230]. In this case, the eNB may transmit a paging rejection message to the MME/SGSN1. That is, although not explicitly shown in the drawing, the eNB may transmit the paging rejection message to the MME/SGSN1 by reason of its congestion state, and after receiving the paging rejection message, the MME/SGSN1 may transmit a message indicating DDN failure to an SGW.

On the other hand, instead of the MME/SGSN1, the eNB can determine that the SGSN2 will process the paging network access procedure for the UE. In this case, the eNB includes information indicating that the SGSN2 is an active network entity in the paging message and then transmit the paging message to the UE [S1235]. After receiving the paging message, the UE performs the SR/TAU/RAU procedure through the SGSN2 [S1240], and the SGSN2 transmits to the MME/SGSN1 a message informing that the UE successfully completes the access [S1245]. Of course, if the SGSN is not located in an area where the UE can achieve the access, the UE waits for expiration of the timer included in the paging message as in the related art and then performs the SR/TAU/RAU procedure with respect to the MME/SGSN1. In this case, if the timer in the paging message is made by the MME/SGSM1, it may be T3346. If the timer is from the eNB, it may be a back-off timer of the AS layer (e.g., T302) rather than T3346.

Even if paging retransmission is triggered while the UE accesses the SGSN2, the eNB or MME/SGSM1 does not retransmit the paging message because the eNB or MME/SGSN1 has transmitted the information on the SGSN2 corresponding to the active network entity to the UE.

FIG. 13 shows MO signaling when an eNB/RNC/BSC is congested. When the congested eNB receives an RRC connection request message from a UE [S1305 and S1310], the eNB determines whether it will process the RRC connection request message from the UE [S1315]. Since the eNB is in the congestion state, the eNB determines that the UE access the network through another network entity, SGSN2, which is not congested and then transmits an RRC connection rejection message to the UE by including information on the SGSN2 in the RRC connection rejection message [S1320].

After receiving the RRC connection rejection message, the UE checks whether the SGSN2 is in an accessible area. If it is determined that the UE can access the SGSN2, the UE performs the TAU procedure for accessing the SGSN2 [S1325]. If necessary, the UE needs to change an RAT during this procedure. When the active flag value of the TAU procedure is set to 1, the SR procedure may be performed after the TAU procedure. When the UE successfully completes the SR procedure, the SGSN2 transmits, to the MME/SGSN1, a message informing that the UE completes the access. Thus, the MME/SGSN1 recognizes that the UE completes the access.

According to the above-described embodiments, it is possible to not only reduce unnecessary signaling that may occur in a network congestion state but also minimize the number of cases in which services are not provided to users.

Figures 14, 15:
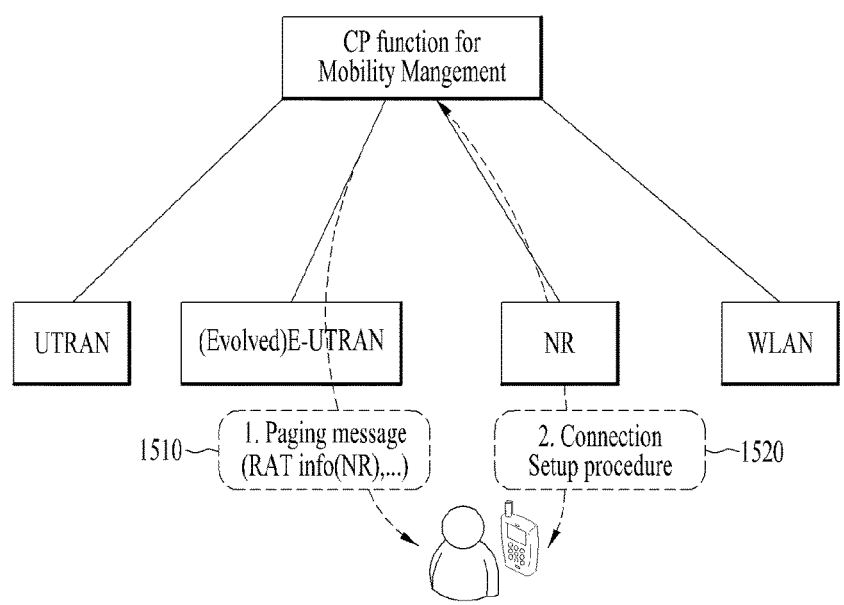
FIG. 14 is a diagram illustrating an example of implementing a message according to a proposed embodiment.
FIG. 15 illustrates an extended scenario to which a proposed embodiment can be applied.

FIG. 14 is a diagram illustrating an example of implementing an EMM rejection message. According to the proposed embodiment, the EMM rejection message transmitted from an MME to a UE may be configured to further include information on an active network entity, and it can be implemented as shown in FIG. 14(a) or 14(b).

According to the embodiment of FIG. 14(a), the information on the active network entity transmitted to the UE can also indicate 'whether access using another RAT is allowed'. If a bit for indicating the corresponding information is set to 0, the access through another RAT is allowed so that the above-described embodiments can be applied. If the bit is set to 1, the access through another RAT is not allowed so that the UE should wait for timer expiration and reattempt to access the network.

According to the embodiment of FIG. 14(b), a specific RAT can be explicitly indicated as the information on the active network entity. That is, the active network entity information may explicitly indicate which RAT the UE should use in attempting to access the network. Not only the embodiment shown in FIG. 14, other information such as an ID of the active network entity, a cell ID, etc. can be provided for the UE to access the network as described above.

Meanwhile, although the present invention has been described with respect to interaction between RATs in the 3GPP network, the proposed embodiment can be applied to operation between the 3GPP network and a non-3GPP network.

FIG. 15 illustrates another extended example of the proposed embodiment.

According to the currently discussed 5G network structure, regarding a UE having at least one RAT capability, there is a connection between a CP function entity in charge of mobility management (MM) and a plurality of RATs. In addition, the CP function entity checks the UE's capability while the UE performs an access procedure.

In this environment, when a paging message is transmitted to the UE, an 'RAT that the UE should attempt to access' can be explicitly indicated and transmitted [S1510]. The RAT that the UE should attempt to access can be determined in consideration of a service type provided to the UE (e.g., voice call, low data rate, high data rate, MTC service, SMS service, delay sensitivity, etc.), a mobility level of the UE (e.g., high mobility, low mobility, no mobility, etc.), load and congestion states of each RAT, and the like. For example, in the case of a UE with high mobility, the RAT may be determined as E-UTRAN. In the case of a service that requires a high data rate, NR may be selected as the RAT.

After receiving the paging message, the UE performs a series of connection setup procedures (similar to the SR procedure in the legacy system) to establish a connection through the indicated RAT [1520]. When the UE cannot access the indicated RAT, the UE informs the network of corresponding reasons. By doing so, it is possible to prevent user's services from being delayed when the UE cannot access the specific RAT (due to denial or blocking of access). In addition, according to the related art, when the UE needs to move from an RAT which the UE currently camps on to a different RAT due to a network state or characteristics of the UE (service characteristics, mobility, capability, etc.), the UE should first perform the paging and connection setup procedures through the current RAT to perform handover to the different RAT. However, according to the proposed embodiment, the UE can establish a connection to the different RAT without a handover procedure. Meanwhile, the above-described CP function entity may be implemented for each RAT. To solve the aforementioned problems, a plurality of CP function entities for individual RATs can share information with each other, that is, exchange load states, congestion states, UE context information periodically or aperiodically.

4. Device Configurations

Figure 16:
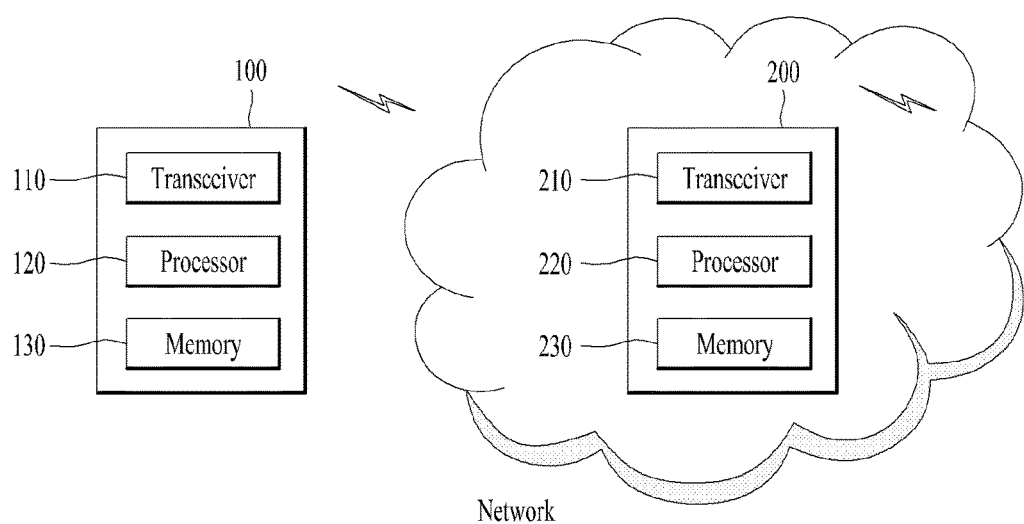
FIG. 16 is a diagram illustrating the configuration of a node device according to a proposed embodiment.

FIG. 16 is a diagram illustrating configurations of node devices according to a proposed embodiment.

A user equipment (UE) 100 may include a transceiver 110, a processor 120, and a memory 130. The transceiver 110 may be configured to transmit and receive various signals, data, and information to/from an external device. Alternatively, the transceiver 110 may be implemented with a combination of a transmitter and a receiver. The UE 100 may be connected to the external device by wire and/or wirelessly. The processor 120 may be configured to control overall operations of the UE 100 and process information to be transmitted and received between the UE 100 and the external device. Moreover, the processor 120 may be configured to perform the UE operation proposed in the present invention. The memory 130, which may be replaced with an element such as a buffer (not shown in the drawing), may store the processed information for a predetermined time.

Referring to FIG. 16, a network node 200 according to the present invention may include a transceiver 210, a processor 220, and a memory 230. The transceiver 210 may be configured to transmit and receive various signals, data, and information to/from an external device. The network node 200 may be connected to the external device by wire and/or wirelessly. The processor 220 may be configured to control overall operations of the network node 200 and process information to be transmitted and received between the network node device 200 and the external device. Moreover, the processor 220 may be configured to perform the network node operation proposed in the present invention. The memory 230, which may be replaced with an element such as a buffer (not shown in the drawing), may store the processed information for a predetermined time.

The specific configurations of the UE 100 and the network node 200 may be implemented such that the aforementioned various embodiments of the present invention can be independently applied or two or more embodiments can be simultaneously applied. For clarity, redundant description will be omitted.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein.

INDUSTRIAL APPLICABILITY

The aforementioned communication method can be applied to not only the 3GPP system but also various wireless communication systems including an IEEE 802.16x system and IEEE 802.11x system. Further, the proposed method can also be applied to an mmWave communication system using super-high frequency band.

What is claimed is:

1. A communication method performed by a network entity in a congestion state for transmitting and receiving information for network access by a user equipment (UE) in a wireless communication system, the method comprising:
    receiving, by the network entity, state information from a plurality of network entities adjacent to the network entity;
    determining, by the network entity, whether there is at least one network entity which is not in the congestion state among the plurality of network entities based on the state information;
    when there is at least one network entity which is not in the congestion state, among the plurality of network entities, selecting, by the network entity, one network entity among the at least one network entity and transmitting, by the network entity to the UE, a first message comprising information for the UE to access the selected network entity said information indicating the selected network entity and first backoff timer information that applies only to network entities other than the selected network entity; and
    when there is no network entity not in the congestion state among the plurality of network entities, transmitting, by the network entity to the UE, a second message comprising second backoff timer information that applies to all network entities.

2. The communication method of claim 1, wherein the plurality of network entities comprise a network entity where Idle mode Signaling Reduction (ISR) is activated in association with the network entity, and
    wherein the selecting comprises selecting the network entity where the ISR is activated from among the plurality of network entities.

3. The communication method of claim 1, further comprising:
    when the one network entity is selected, receiving, from the selected network entity, a third message indicating that network access by the UE has been completed.

4. The communication method of claim 1, wherein the information for the UE to access the selected network entity further comprises at least one of information on whether access to a different Radio Access Technology (RAT) is allowed, information on a RAT corresponding to the selected network entity, and information on an ID of a cell to be accessed by the UE.

5. The communication method of claim 4, wherein the information for the UE to access the selected network entity indicates that the UE needs to access the selected network entity using information for accessing the selected network entity.

6. The communication method of claim 1, wherein the first message and the second message correspond to a paging message or an Evolved Packet System Mobility Management (EMM) rejection message, respectively.

7. The communication method of claim 1, wherein the state information comprises at least one of information indicating a load state of each of the plurality of network entities and information indicating a congestion state of each of the plurality of network entities, and wherein the state information is received from each of the plurality of network entities periodically or aperiodically.

8. The communication method of claim 1, wherein the selected network entity is selected from among network entities corresponding to Radio Access Technologies (RATs) that the UE can support.

9. The communication method of claim 1, wherein each network entity including the selected network entity is implemented as a Mobility Management Entity (MME), a Serving General packet radio service Supporting Node (SGSN), an evolved Node B (eNB), a Radio Network Controller (RNC) or a Base Station Controller (BSC).

10. A network entity for transmitting and receiving information for network access by a user equipment (UE) in a congestion state, the network entity comprising:
    a transmitter;
    a receiver; and
    a processor connected to the transmitter and the receiver, wherein the processor controls the receiver to:
    receive state information from a plurality of network entities adjacent to the network entity,
    wherein the processor determines whether there is at least one network entity which is not in the congestion state from among the plurality of network entities based on the state information;
    wherein when there is at least one network entity which is not in the congestion state among the plurality of network entities, the processor selects one network entity among the at least one network entity, and controls the transmitter to transmit, to the UE, a first message comprising information for the UE to access the selected network entity, said information indicating the selected network entity and first backoff timer information that applies only to network entities other than the selected network entity, and
    wherein when there is no network entity not in the congestion state among the plurality of network entities, the processor controls the transmitter to transmit, to the UE, a second message comprising second backoff timer information that applies to all network entities.

* * * * *